Figure 1:
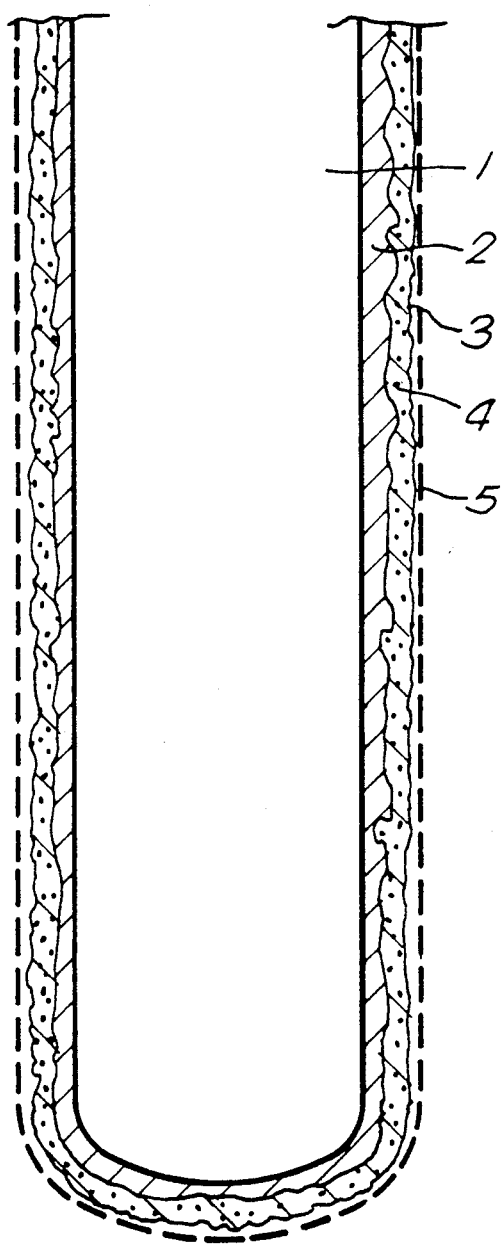

United States Patent [19]

Daish

[11] Patent Number: 5,035,875
[45] Date of Patent: Jul. 30, 1991

[54] RECOMBINATION CATALYST

[75] Inventor: Stephen R. Daish, Sunbury on Thames, United Kingdom

[73] Assignee: British Nuclear Fuels Plc, Warrington, England

[21] Appl. No.: 464,015

[22] Filed: Jan. 12, 1990

[30] Foreign Application Priority Data

Jan. 27, 1989 [GB] United Kingdom ............... 8901738

[51] Int. Cl.$^5$ .............................................. C01B 5/00
[52] U.S. Cl. .................................. 423/580; 423/249; 376/301
[58] Field of Search ................ 376/301; 423/249, 580

[56] References Cited

U.S. PATENT DOCUMENTS 4,217,332  9/1980  Hindin et al. ...................... 423/249
4,298,439 11/1981  Gatney .......................... 204/157.52
4,374,116  2/1983  Chuang et al. ..................... 423/580

Primary Examiner—Stephen J. Lechert, Jr.
Assistant Examiner—Nina Bhat
Attorney, Agent, or Firm—William R. Hinds

[57] ABSTRACT

A container for radioactive material includes therein a catalyst device for catalyzing the recombination of gaseous hydrogen and oxygen in the container to give water, e.g. in a storage vessel for radioactive material. The device comprises a substrate in the form of at least one metal member (e.g. stainless steel) carrying a thermally sprayed low surface area ceramic coating (e.g. plasma sprayed alumina) which carries a high surface area ceramic coating (e.g. alumina from a sol), which latter coating carries catalytically active material (e.g. Pt metal), the catalyst having an outer, hydrophobic gas permeable coating (e.g. polysiloxane) for preventing the catalytically active material from contacting water.

14 Claims, 2 Drawing Sheets

RECOMBINATION CATALYST

This invention relates to a container for radioactive material including a catalyst device for the recombination of gaseous hydrogen and oxygen.

It is known to store spent fuel from nuclear reactors under water within a storage vessel, and it is also known to store radioactive material in an aqueous solution within a storage vessel. In each of these situations radiation from the radioactive material will bring about radiolysis of the water also present in the vessel, generating hydrogen and oxygen. Although some of the radiolysis products will remain in solution in the water, some of the hydrogen and oxygen gases will collect in an ullage space above the water level, so the concentration of hydrogen would eventually exceed the explosive limit in air. This can be avoided by flushing out the ullage space with fresh non-explosive gas either continuously or at regular intervals.

The present invention provides a container such as a storage vessel that can be used to avoid the need for the above-described gas changing. Thus, the invention provides a container for radioactive material including therein a catalytic device for catalysing the recombination of gaseous hydrogen and oxygen in the container to give water, the device comprising a substrate in the form of at least one metal member and carrying a thermally sprayed low surface area ceramic coating which carries a high surface area ceramic coating, which latter coating carries catalytically active material for the recombination, the device having an outer, hydrophobic gas permeable coating resistant to nuclear radiation for preventing water from contacting the catalytically active material, the device being located in the container so that the hydrogen and oxygen are brought into contact with the device by passive gas transfer and oriented such as to enable water to drain therefrom.

The container of the invention can be used as a vessel for the storage of radioactive material, for short or long-term storage or during transport, where the catalyst device prevents the above-mentioned build-up of the products of water radiolysis by recombining radiolytic hydrogen and oxygen back to water. The catalyst device is preferably supported below the top of the vessel by thermally insulating means so that the temperature of the catalyst device is about the same as that of the contents of the vessel.

The catalyst device included in the container of the present invention, in one or more specific embodiments thereof, has the following advantages and/or properties:
its shape and size can be controlled to fit the vessel;
it can work effectively at ambient temperature (about 25° C.);
it can work at low hydrogen gas concentrations, for example less than 2%;
the presence of a metal substrate allows good heat transfer thus preventing hot spots;
the catalyst device may be vertically orientated to allow water drainage;
forced flow is not necessary to bring the gas mix into contact with the catalyst device;
the hydrophobic coating may be chosen to be resistant to radiation. In a specific example, the coating was active and water repellant after an accumulated dose of 500 MR;
the catalyst device remained active after being totally immersed in water;
the catalyst device remained active after being totally immersed in a caustic solution of pH 12 such as may be found in fuel storage ponds; and
the catalyst device is active after exposure to saturated water vapour for periods of up to 13 days.

The components of the present invention will now be discussed in further detail.

SUBSTRATE

An example of a metal substrate is a stainless steel substrate since stainless steel is robust, cheap, corrosion resistant and is a good conductor of heat. Another example of a metal that may be used is an aluminium-bearing iron base alloy. Such alloys are known to resist corrosion and, e.g. when in the form of aluminium-bearing ferritic steels, are known to oxidise to form a substantially alumina protective oxide layer, the integrity of which is maintained by supply of aluminium from within the alloy to sustain oxide growth and to repair flaws. Examples of such steels are those of the following composition by weight: 1–30% Cr, 1–10% Al, 0–0.5% Y, and the balance Fe. Such steels may be available in the UK under the UK Registered Trade Mark 'FECRALLOY' where the steel composition includes a small proportion of Y; examples are steels in the composition range by weight: 15–22% Cr, 4–5.2% Al, 0.05–0.4% Y, and the balance Fe. The art contains many references to aluminium-bearing ferritic steels. See, for example, J. E. Antill, 'Fecralloy steels' Stainless Steel Ind. 7 (36) March 1979, and P. T. Moseley at al, 'The Microstructure of the Scale Formed During the High Temperature Oxidation of Fecralloy Steel', Corrosion Science 24 No. 6 (1984) p. 547.

Conveniently, the metal substrate may be in the form of a plate or cylinder, for example of a few millimeters thickness. The plate may be flat, H-shaped, U-shaped, curved, bent or welded as desired into a convenient shape which can be secured in the container by a suitable fixing means such as a clamping device or by bolts.

LOW SURFACE AREA CERAMIC COATING

The purpose of the above is to give a coherent coating that is strongly bonded to the metal substrate and that is sufficiently rough to enable the high surface area ceramic coating to be satisfactorily bonded thereto. "Low surface area" includes less than $1 \, m^2 g^{-1}$. Also, the coating desirably has a low porosity such as less than 3%. The thickness of the coating may, for example, be of the order of tens of micrometers.

The ceramic may, for example, be a ceramic oxide, specific examples of which are aluminium oxide, zirconium(IV) oxide, titanium(IV) oxide, and tin(IV) oxide. Aluminium oxide is preferred.

'Thermal spraying' is a generic term for a known method of spraying a solid material, e.g. in the form of powder, by melting it or causing it to become plastic and projecting the molten or plastic material with high kinetic energy onto a target which, in the present invention, is the metal substrate. The term includes plasma spraying and flame spraying, the former being preferred in the present invention. Material suitable for plasma spraying is described in Thin Solid Films, 95 (1982) 219-225, a paper by K. T. Scott and J. L. Woodhead entitled "Gel-Processed Powders for Plasma Spraying".

In plasma spraying, the material in powdered form is rapidly heated in a DC arc-plasma and then projected at high velocity in the molten or plastic state onto the substrate surface where it quenches and adheres to produce the coating. For example, the heat source in the plasma process may be an electric arc struck between two electrodes, the anode of which serves as a nozzle. By suitable design, the arc is constricted and stabilised within the latter, generating temperatures of up to 20,000° K. with the ionised gases being ejected at exit velocities of several hundred meters per second. The arc plasma is a source of high thermal and kinetic energy to entrained material. Plasma spraying may be performed using a commercially available plasma spray gun operating for example at a power level between 20 and 80 KW and using nitrogen, argon or helium as the main plasma gas.

HIGH SURFACE AREA CERAMIC COATING

The purpose of the above is to support the catalytically active material and allow it to be highly dispersed over a large area. "High surface area" includes 70 $m^2g^{-1}$ or greater, for example 80-100 $m^2g^{-1}$. The thickness of the coating may, for example, be of the order of tens of micrometers. As a specific example, the ceramic may be aluminium oxide whose specific surface at a tempeature below 1100° C. is not less than 70 $m^2g^{-1}$ (e.g. in the range 80 $m^2g^{-1}$ to 100 $m^2g^{-1}$) and whose total pore volume at a temperature below 1100° C. is not less than 0.50 $dm^3kg^{-1}$ (e.g. in the range from 0.50 $dm^3kg^{-1}$ to 0.85 $dm^3kg^{-1}$).

The ceramic may, for example, be a ceramic oxide, specific examples of which are aluminium oxide, beryllium oxide, zirconium(IV) oxide, thorium(IV) oxide, and silicon(IV) oxide. Aluminium oxide is preferred. The ceramic may be the same as or different from the ceramic of the low surface area ceramic coating.

The ceramic preferably has a structure comprising loose aggregates of primary-particles, in which aggregates there are point to point contacts between the primary-particles and spaces within the structure. Such a structure is able substantially to maintain its surface area after heat treating because the point to point contacts offer few opportunities for sintering and hence loss of surface area. Such a ceramic coating may be obtained by contacting the coated substrate with a dispersion in a liquid medium of colloidal particles of the ceramic, followed by drying and firing, the colloidal particles having been made by a vapour phase condensation method such as flame hydrolysis. The production and use of such dispersions (or sols) to produce coatings is described in GB-A-1 568 861 (equivalent to U.S. Pat. No. 4,397,770).

CATALYTICALLY ACTIVE MATERIAL

The material may, for example, be a noble metal such as a platinum group metal (i.e. Os, Ir, Pt, Pd, Rd br Ru), and may comprise more than one metal. Preferred examples are Pt, Pd and Au.

The material may conveniently be applied by contacting the coated substrate with a solution of a salt that is convertible (e.g. by thermal decomposition) to the material, followed by drying and treatment (e.g. heating) to effect the conversion. If desired, the material may be applied at the same time as the high surface area ceramic coating. Preferably, however, the material is applied separately and after the high surface area ceramic coating has been applied.

The loading of the catalytically active material may, for example, be in the range of $1-2000 \times 10^{-4}$ g cm$^{-2}$ based upon the surface area of the substrate, assumed flat.

HYDROPHOBIC GAS PERMEABLE COATING

The purpose of the coating is to allow access of the reactant gases—hydrogen and oxygen—to the catalyst whilst at the same time preventing wetting of the catalyst. Also, it may be important for the coating to retain its performance even after prolonged exposure to moisture or intense radiation fields.

Examples of preferred coating materials are silicones such as polysiloxanes (e.g. polyalkylsiloxanes) which are known in the art for waterproofing catalysts: see, for example Canadian Patent No. 907 292.

The coating may be applied by contacting the catalyst with the coating material followed by heating. The temperature has to be sufficiently high to cause gas permeability to be generated in the coating but not so high as to degrade the coating and cause it to lose its hydrophobicity.

Figure 2:
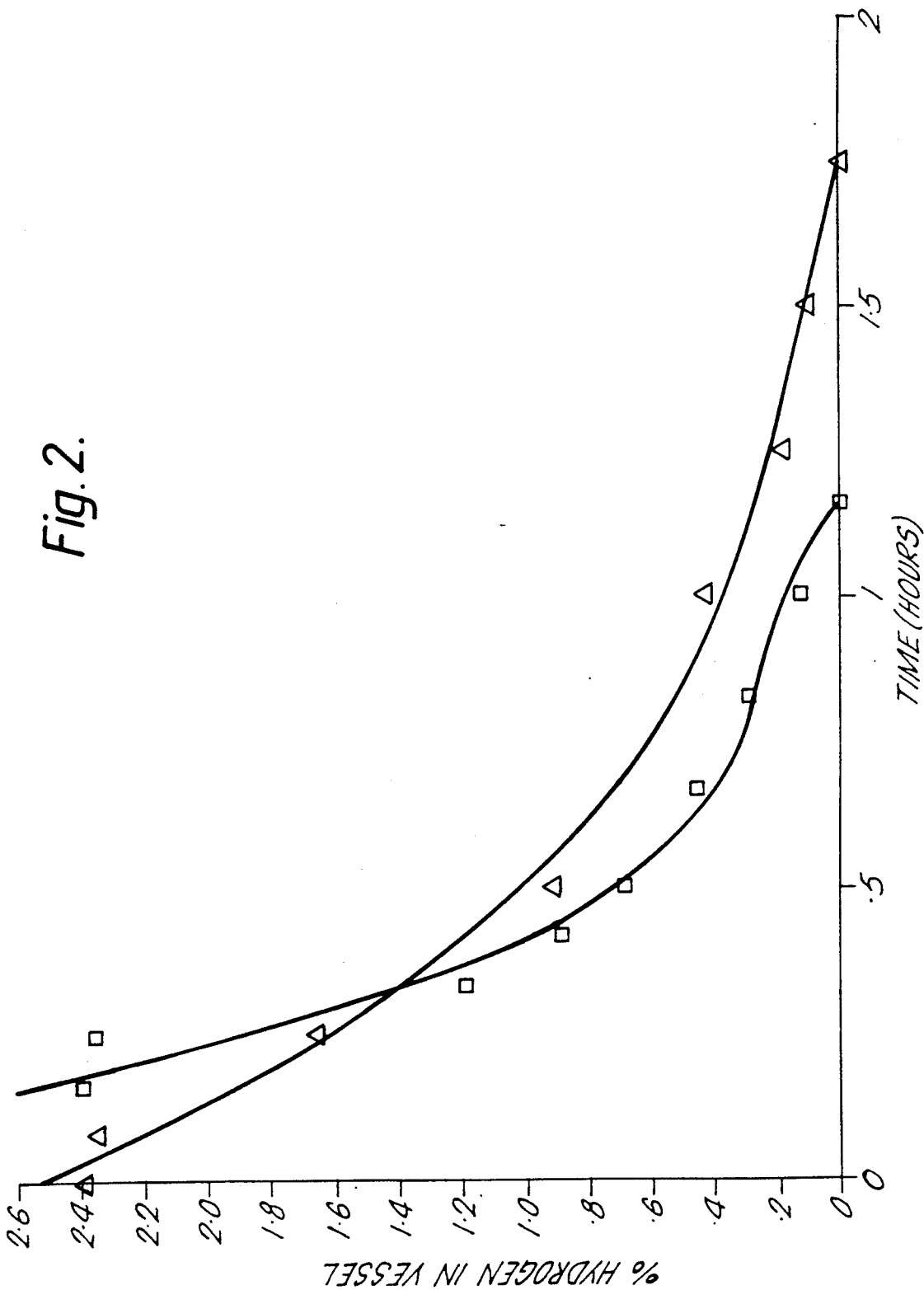

The invention will now be described by way of example only with reference to the accompanying drawings in which:

FIG. 1 is a schematic cross-section of a catalyst device for inclusion in a container of the invention; and FIG. 2 is a graph of percentage hydrogen in a vessel against time obtained in tests of catalyst devices for use in this invention.

EXAMPLE

Preparation of Catalyst Device and Container

A stainless steel sheet (stainless steel 304) of a few millimeters thickness and having a hole to enable it to be bolted to the side of a storage vessel for radioactive material was firstly grit blasted to assist the coating to adhere and then plasma sprayed using a plasma spray gun to provide a low surface area alumina (less than 1 $m^2g^{-1}$) of tens of micrometer thickness.

An alumina aquasol (concentration 270 g $Al_2O_3 l^{-1}$) was prepared by dispensing in water alumina that had been made by flame hydrolysis, and was brushed onto the plasma sprayed sheet. The sheet was then dried in an oven at about 80° C. for about an hour and calcined in a furnace at about 400° C. for about an hour to generate a high surface area alumina coating (about 80 $m^2g^{-1}$) of tens of micrometers thickness on the plasma sprayed sheet. Alternatively, the aquasol could have been applied, for example by spraying or dipping.

An aqueous solution of $Pt(NH_3)_4Cl_2$ (10 g in 50 ml water) was prepared and brushed onto the above coated sheet which was then dried in an oven at about 80° C. for about an hour. The brushing and drying procedure was repeated twice more and then the sheet was calcined in a furnace at about 400° C. for about an hour to decompose the above Pt salt to Pt metal. The Pt loading was $4-5 \times 10^{-4}$ g cm$^{-2}$ based on the surface area of the plate. Alternatively, the aqueous solution could have been applied by spraying or dipping.

An oily polysiloxane fluid, sold commercially by Dow Corning as DC 200, viscosity 20 cs, was brushed onto the catalyst as a thin even, complete coating. The catalyst was then heated at about 200° C. to render the coating gas permeable and fully bonded to the surface.

The catalyst device is shown schematically in FIG. 1 where the reference numerals represent for following components:
1: substrate
2: low surface area coating
3: high surface area coating
4: catalytically active metal (platinum)—shown as dots
5: hydrophobic coating—shown as a dotted line A plurality of sheets were then secured in a container vessel for radioactive material by means of bolts.

Testing of Catalyst Device

Tests were performed by introducing a mixture of hydrogen and air in a previously evacuated stainless steel vessel, periodically taking a small sample of the mixture from the vessel, and measuring the ratio of hydrogen to nitrogen in the sample mass spectrometrically. The sampling and measuring were over a period of time for catalysts that lacked the hydrophobic coating and for catalysts having the hydrophobic coating and under different conditions, namely when dry and when wet and with or without being exposed to irradiation.

The results are summarised in the Table below where, in each case, the catalyst comprised four stainless-steel plates 25 mm square, coated on both sides with a Pt loading of 0.47 mg cm$^{-2}$. Some of the tests were carried out using a dry catalyst, indicated by DRY in the Table, and others using a catalyst that had been immersed in water for a few minutes before testing, indicated by WET in the Table

| CATALYST (with or without hydrophobic coating) | RATE CONSTANT (1 mol$^{-1}$s$^{-1}$) | EQUILIBRIUM CONCENTRATION (% H$_2$ by vol.) | % OF FLAMMABILITY LIMIT |
|---|---|---|---|
| A | 13.51 | 0.05 | 2.3 |
| B | 1.59 | 0.16 | 6.7 |
| C | 1.38 | 0.17 | 7.2 |
| D | 0.66 | 0.25 | 10.4 |
| E | 0.15 | 0.53 | 21.7 |

Key
A Uncoated (DRY)
B Coated (DRY)
C Coated (WET)
D Coated (WET); exposed to 100 Mrads in pond facility
E Coated (WET); exposed to 500 Mrads in pond facility In the above Table, the rate constant was calculated by known methods and based on the finding that the reaction followed second order kinetics, the equilibrium concentration of hydrogen was calculated assuming a radiolytic hydrogen generation rate of 5 1 per day in an ullage space of 300 1, and the equilibrium concentration expressed as a percentage of the lower flammability limit of hydrogen, i.e. 2.42% by volume.

The results in the Table show that the catalyst is most active when dry and when lacking the hydrophobic coating, and that efficiency is reduced by prior immersion in water and further reduced by exposure to a radiation field. However, even after a total radiation dose of 500 Mrads and when tested wet, it is sufficiently active to maintain the hydrogen concentration in the flask at around 22% of the flammability limit.

In a second set of tests, carried out as described above, the % of hydrogen by volume in the vessel was measured as a function of time when a catalyst of the invention had first been exposed to saturated water vapour which simulates the conditions the catalyst would experience in a fuel storage vessel. Two series of experiments were carried out: one where the catalyst had been exposed to water vapour for 12 days and one where the catalyst had been exposed to water vapour for 2 days. The results were shown in FIG. 2 where the triangular plots are those for a catalyst subjected to the 12 day treatment and the square plots for a catalyst subjected to the 2 day treatment. They indicate that the exposure time has only a minor effect on the efficiency of the catalyst.

I claim:

1. A container for radioactive material including therein a catalytic device for catalysing the recombination of gaseous hydrogen and oxygen in the container to give water, the device comprising a substrate in the form of at least one metal member and carrying a thermally sprayed low surface area ceramic coating which carries a high surface area ceramic coating, which latter coating carries catalytically active material for the recombination, the device having an outer, hydrophobic gas permeable coating resistant to nuclear radiation for preventing water from contacting the catalytically active material, the device being located in the container so that the hydrogen and oxygen are brought into contact with the device by passive gas transfer and oriented such as to enable water to drain therefrom.

2. A container according to claim 1 wherein the substrate is in the form of at least one steel member.

3. A container according to claim 2 wherein the steel is a stainless steel or an aluminium-bearing ferritic steel.

4. A container according to claim 1 wherein the low surface area ceramic coating ia a plasma sprayed ceramic oxide coating of surface area less than 1 m$^2$g$^{-1}$.

5. A container according to claim 4 wherein the ceramic oxide is aluminium oxide and has a porosity of less than 3%.

6. A container according to claim 1 wherein the high surface area ceramic coating is a ceramic oxide coating having a surface area of 70 m$^2$g$^{-1}$ or greater.

7. A container according to claim 6 wherein the ceramic oxide is aluminium oxide having a structure comprising loose aggregates of primary-particles in which there are internal cavities and point to point contacts between primary-particles and having a surface area in the range 80 m$^2$g$^{-1}$ to 100 m$^2$g$^{-1}$$^{1}$.

8. A container according to claim 1 wherein the catalytically active material is a noble metal.

9. A container according to claim 8 wherein the noble metal is platinum, palladium or gold.

10. A container according to claim 1 wherein the outer, hydrophobic gas permeable coating is of a polysiloxane.

11. A container according to claim 10 wherein the polysiloxane is a polyalkylsiloxane.

12. A container for radioactive material including therein a catalytic device for catalysing the recombination of gaseous hydrogen and oxygen in the container to give water, the device comprising at least one steel member substrate carrying a plasma sprayed alumina coating of surface area less than 1 m$^2$g$^{-1}$ which carries an alumina coating of surface area 70 m$^2$g$^{-1}$ or greater and having a structure comprising loose aggregates of primary-particles in which there are internal cavities and point to point contacts between primary-particles, which latter coating carries a noble metal catalyst for catalysing the recombination, the device having an outer, hydrophobic gas permeable coating of a polysilixane resistant to nuclear radiation for preventing water from contacting the noble metal catalyst, the device being located in the container so that the hydrogen and oxygen are brought into contact with the device by passive gas transfer and oriented such as to enable water to drain therefrom.

13. A container as claimed in claim 1 wherein the device is supported by thermally insulating means, whereby the temperature of the device is maintained substantially the same as that of any contents of the container.

14. A container as claimed in claim 13 wherein the device comprises a plurality of sheets secured in the container.

* * * * *